United States Patent
Takami et al.

(10) Patent No.: US 9,806,340 B2
(45) Date of Patent: Oct. 31, 2017

(54) NONAQUEOUS ELECTROLYTE BATTERY AND BATTERY PACK

(71) Applicant: Kabushiki Kaisha Toshiba, Minato-ku (JP)

(72) Inventors: Norio Takami, Yokohama (JP); Wen Zhang, Sagamihara (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/622,480

(22) Filed: Jun. 14, 2017

(65) Prior Publication Data

US 2017/0279118 A1    Sep. 28, 2017

Related U.S. Application Data

(63) Continuation of application No. 14/489,665, filed on Sep. 18, 2014.

(30) Foreign Application Priority Data

Sep. 20, 2013  (JP) .................................. 2013-196129

(51) Int. Cl.
*H01M 4/13* (2010.01)
*H01M 4/485* (2010.01)
(Continued)

(52) U.S. Cl.
CPC ........... *H01M 4/485* (2013.01); *H01M 4/366* (2013.01); *H01M 4/505* (2013.01); *H01M 4/525* (2013.01);
(Continued)

(58) Field of Classification Search
CPC ....... H01M 10/0525; H01M 2004/021; H01M 4/366; H01M 4/485; H01M 4/505; H01M 4/525; H01M 4/587
See application file for complete search history.

(56) References Cited

U.S. PATENT DOCUMENTS

| | | | |
|---|---|---|---|
| 5,545,468 A * | 8/1996 | Koshiba ................ | H01M 4/485 429/231.1 |
| 2003/0010631 A1* | 1/2003 | Anzai ................... | H01M 4/364 204/293 |

(Continued)

FOREIGN PATENT DOCUMENTS

| CN | 1702894 A | 11/2005 |
|---|---|---|
| CN | 101170201 | 4/2008 |

(Continued)

OTHER PUBLICATIONS

Office Action dated May 3, 2016, in corresponding Chinese Patent Application No. 2014104665555 (with English-language Translation).

(Continued)

*Primary Examiner* — Patrick Ryan
*Assistant Examiner* — Ben Lewis
(74) *Attorney, Agent, or Firm* — Oblon, McClelland, Maier & Neustadt, L.L.P.

(57) ABSTRACT

According to one embodiment, a nonaqueous electrolyte battery including a positive electrode and a negative electrode is provided. The positive electrode includes $LiNi_xM_{1-x}O_2$ wherein M is a metal element including Mn, and x is within a range of $0.5 \leq x \leq 1$. The negative electrode includes graphitized material particles and a layer. The graphitized material particles have an interplanar spacing of (002), according to an X-ray diffraction method, of 0.337 nm or less. The layer includes a titanium-containing oxide. The (Continued)

layer covers at least a part of a surface of the graphitized material particles.

21 Claims, 2 Drawing Sheets

(51) Int. Cl.
<table>
<tr><td>H01M 4/525</td><td>(2010.01)</td></tr>
<tr><td>H01M 4/505</td><td>(2010.01)</td></tr>
<tr><td>H01M 4/587</td><td>(2010.01)</td></tr>
<tr><td>H01M 4/36</td><td>(2006.01)</td></tr>
<tr><td>H01M 10/0525</td><td>(2010.01)</td></tr>
<tr><td>H01M 4/02</td><td>(2006.01)</td></tr>
</table>

(52) U.S. Cl.
CPC ........ *H01M 4/587* (2013.01); *H01M 10/0525* (2013.01); *H01M 2004/021* (2013.01)

(56) References Cited

U.S. PATENT DOCUMENTS

| | | |
|---|---|---|
| 2006/0172201 A1 | 8/2006 | Yasukawa |
| 2008/0044728 A1 | 2/2008 | Schmidt |
| 2008/0102369 A1* | 5/2008 | Sakata ............... H01M 4/13 429/188 |
| 2010/0143773 A1 | 6/2010 | Honbou |
| 2012/0009477 A1* | 1/2012 | Chen ............... H01M 4/366 429/224 |
| 2012/0326102 A1 | 12/2012 | Satoh |

FOREIGN PATENT DOCUMENTS

| | | |
|---|---|---|
| CN | 102782912 | 11/2012 |
| EP | 1 255 311 | 11/2002 |
| JP | 2001-243950 | 9/2001 |
| JP | 2002-110157 | 4/2002 |
| JP | 2008-041465 | 2/2008 |
| JP | 2009-252421 | 10/2009 |
| JP | 2010-182477 | 8/2010 |
| JP | 2011-90876 | 5/2011 |
| JP | 2012-89245 | 5/2012 |

OTHER PUBLICATIONS

Office Action dated Feb. 7, 2017, in corresponding Japanese Patent Application No. 2013-196129.
Chinese Office Action dated May 4, 2017, in Chinese Patent Application No. 201410466555.5.

* cited by examiner

NONAQUEOUS ELECTROLYTE BATTERY AND BATTERY PACK

CROSS-REFERENCE TO RELATED APPLICATIONS

This application is a continuation application of U.S. Ser. No. 14/489,665, filed Sep. 18, 2014; which is based upon and claims the benefit of priority from Japanese Patent Application No. 2013-196129, filed Sep. 20, 2013, the entire contents of which are incorporated herein by reference.

FIELD

Embodiments described herein relate generally to a nonaqueous electrolyte battery and battery pack.

BACKGROUND

Nonaqueous electrolyte batteries using, for a negative electrode, a graphitized material or a carbonaceous material absorbing and releasing lithium ions have been commercialized as batteries for mobile devices having a high energy density. Recently, in order to further improve the energy density of the battery, practical applications of lithium metal oxides including Ni, such as lithium nickel cobalt aluminum oxide or lithium nickel cobalt manganese oxide, have been advanced as a positive electrode active material, to replace $LiCoO_2$ or $LiMn_2O_4$.

On the other hand, when a battery is mounted on vehicles such as cars and trains, a material forming a positive electrode and a negative electrode is required to have excellent chemical or electrochemical stability, strength, and corrosion resistance, in terms of a storage performance in a high temperature atmosphere, a cycle performance, reliably high output over a long term, and the like. The material forming the positive electrode and the negative electrode is further required to have high performances in a cold district, a high output performance in a low temperature (−40° C.) atmosphere, and a long cycle life performance. However, development of a nonvolatile and incombustible electrolytic solution has been advanced as a nonaqueous electrolyte in terms of improvement of a safety performance, but it has not yet been put to practical application, because reduction of an output characteristic, a low temperature performance, and a cycle life performance also occur.

As explained above, in order to mount the lithium ion battery on a vehicle, or the like, issues such as a durability at a high temperature, a cycle life, a safety, and an output performance need to be overcome.

Various attempts to improve the negative electrode performances of the graphitized material or the carbonaceous material, accordingly, have been made. For example, an additive is added to an electrolytic solution to suppress reductive decomposition of the electrolytic solution for a graphite negative electrode, whereby the cycle life performance is improved. In addition, in order to improve the output performance, studies of granulation of particle shape or reduction of a particle size have taken place. It is difficult, however, to reduce the particle size (the particle diameter) (e.g., a size of 10 μm or less), because the life performance is reduced due to increased reductive decomposition of the electrolytic solution at a high temperature.

In order to improve the energy density by increasing a positive electrode capacity, practical application of the lithium metal oxide including Ni such as lithium nickel cobalt aluminum oxide or lithium nickel cobalt manganese oxide has been advanced to replace $LiCoO_2$ or $LiMn_2O_4$.

When graphitized material particles are used for the negative electrode, however, in a case where the Lithium metal oxide including Ni is used for the positive electrode, the cycle life at a high temperature and the safety (in particular the internal short-circuit) are reduced, and thus it is difficult to put it into practical application of a large size secondary battery for mounting on vehicles or a stationary large size secondary battery.

DETAILED DESCRIPTION

Figure 1:
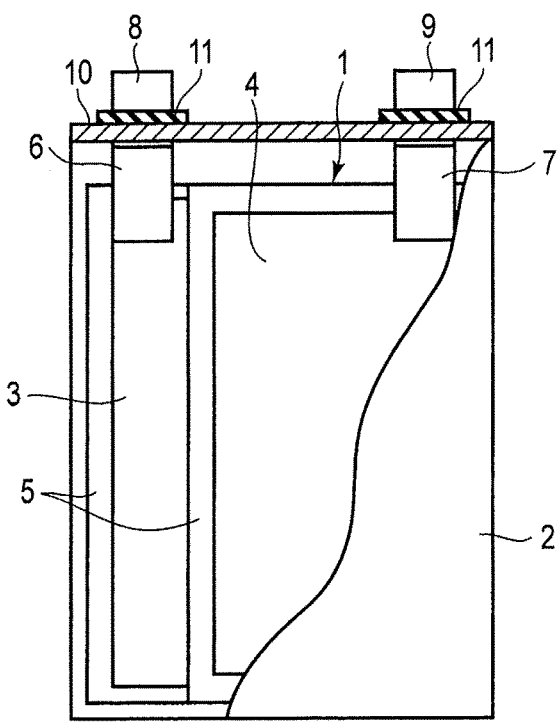
FIG. 1 is a partial cross-sectional view showing a nonaqueous electrolyte battery according to an embodiment.

According to one embodiment, a nonaqueous electrolyte battery including a positive electrode, a negative electrode, and nonaqueous electrolyte is provided. The positive electrode includes $LiNi_xM_{1-x}O_2$ wherein M is a metal element including Mn, and x is within a range of $0.5 \leq x \leq 1$. The negative electrode includes graphitized material particles and a layer. The graphitized material particles have an interplanar spacing of (002), $d_{002}$, according to an X-ray diffraction method, of 0.337 nm or less. The layer includes titanium-including oxide. The layer covers at least a part of a surface of the graphitized material particles.

According to an embodiment, a battery pack including the nonaqueous electrolyte battery of the embodiment is also provided.

First Embodiment

According to a first embodiment, a nonaqueous electrolyte battery including a positive electrode, a negative electrode, and nonaqueous electrolyte is provided. The positive electrode includes a lithium metal oxide represented by the formula: $LiNi_xM_{1-x}O_2$ wherein M is a metal element including Mn, and x is within a range of $0.5 \leq x \leq 1$. The negative electrode includes graphitized material particles and a layer. The graphitized material particles have an interplanar spacing $d_{002}$ derived from (002) reflection, according to the X-ray diffraction method, of 0.337 nm or less. The layer includes titanium-including oxide. The layer covers at least a part of a surface of a graphitized material particle (hereinafter referred to as a covering layer).

The lithium metal oxide represented by the formula: $LiNi_xM_{1-x}O_2$ wherein M is a metal element including Mn, and x is within a range of $0.5 \leq x \leq 1$ has a high capacity (a high energy density), and an excellent thermal stability. Further, the graphitized material particles having an interplanar spacing $d_{002}$, according to the X-ray diffraction method, of 0.337 nm or less have a high capacity (a high energy density), and an excellent electron conductivity. A nonaqueous electrolyte battery including a positive electrode including the lithium metal oxide and a negative electrode including the graphitized material particles can realize a high energy density, but a large current easily flows upon an internal short-circuit, thus resulting in likely occurrence of thermal runaway.

For this reason, at least a part of the surface of the graphitized material particle is covered with the covering layer including the titanium-containing oxide. When a battery voltage reaches 0 V in the internal short-circuit, a releasing reaction of lithium, which is absorbed in the titanium-containing oxide, occurs and the titanium-containing oxide changes to an insulator, and thus a negative electrode resistance can be increased. As a result, a heat generation reaction, caused by short circuit current, can be suppressed, temperature increase of the battery can be suppressed, and thermal runaway can be avoided. The safety of the nonaqueous electrolyte battery, consequently, can be improved.

The titanium-containing oxide can also suppress a reductive decomposition of the graphitized material particles, caused by the nonaqueous electrolyte at a high temperature, and thus the increased negative electrode resistance and the gas generation at a high temperature can be suppressed, and the charge and discharge cycle life performance at a high temperature can be improved.

Further, the titanium-containing oxide can show a high electron conductivity at a battery voltage area usually used (e.g., from 2.5 to 4.2 V), and thus the nonaqueous electrolyte battery can realize an excellent output performance.

From the above, the nonaqueous electrolyte battery having high safety, high output performance, and excellent charge and discharge cycle life performance at a high temperature can be obtained.

The graphitized material particles desirably satisfies the following formula (1):

$$0 \leq I_r/I_h \leq 0.5 \qquad (1)$$

wherein $I_h$ is an intensity of a (101) diffraction peak of a hexagonal system of the graphitized material particles according to an X-ray diffraction method, and $I_r$ is an intensity of a (101) diffraction peak of a rhombohedral system of the graphitized material particles according to the X-ray diffraction method.

Although the graphitized material particles satisfying the formula (1) have a high reactivity with the nonaqueous electrolyte, the covering layer suppresses the reaction between the nonaqueous electrolyte and the graphitized material particles, and thus the resistance, which occurs when lithium ions are absorbed into or released from the negative electrode active material, can be reduced, thus resulting in improved output and input performance. The graphitized material particles also have high thermal stability at a high temperature due to low content of the rhombohedral system, and thus the safety and the charge and discharge cycle life performance at a high temperature can be further improved. The ratio $(I_r/I_h)$ is more preferably within a range of 0 to 0.2.

The titanium-containing oxide includes desirably at least one titanium oxide of $Li_aTiO_2$ ($0 \leq a \leq 2$) and $Li_{4/3+a}Ti_{5/3}O_4$ ($0 \leq a \leq 2$). Such a titanium-containing oxide shows a high electron conductivity at a battery voltage area usually used (e.g., from 2.5 to 4.2 V), and thus the output performance can be further improved. The titanium-containing oxide is also changed to an isolator by causing a releasing reaction of the lithium absorbed upon the internal short-circuit, and thus the battery quickly increases in resistance, and as a result, high safety can be achieved.

When the graphitized material particles satisfying the formula (1) are used, and at the same time at least one titanium oxide of $Li_aTiO_2$ ($0 \leq a \leq 2$) and $Li_{4/3+a}Ti_{5/3}O_4$ ($0 \leq a \leq 2$) is used as the titanium-containing oxide, accordingly, the nonaqueous electrolyte battery having a further improved safety, output performance and charge and discharge cycle life performance at a high temperature can be realized.

The graphitized material particles, at least a part the surface of which is covered with the covering layer, have desirably an average particle diameter of 6 μm or less. When using such particles, a quick charging performance and the output performance can be remarkably improved. The average particle diameter is more preferably within a range of 5 μm or less, further more preferably 3 μm or less. When the average particle diameter is too small, the increased resistance of the negative electrode and the gas generation may likely occur due to the reductive decomposition of the nonaqueous electrolyte at a high temperature, even if the covering layer is present. It is desirable, accordingly, that the lower limit of the average particle diameter is 1 μm.

The nonaqueous electrolyte is desirably in the state of a liquid or gel, and a liquid organic electrolyte is obtained by dissolving a lithium salt in an organic solvent or gelatinous organic electrolyte obtained by combining with a polymer material can be used as the nonaqueous electrolyte. An organic electrolyte having a boiling point of 200° C. or higher or nonaqueous electrolyte including a room temperature molten salt is particularly preferable. The organic electrolyte having a boiling point of 200° C. or the nonaqueous electrolyte including a room temperature molten salt has a low vapor pressure and a small amount of gas generated at a high temperature atmosphere, such as in on-vehicle applications, of 80° C. or higher, and thus the cycle life performance in a high temperature atmosphere can be improved.

As the separator, olefin porous films having a porosity of 50% or more, or cellulose fiber separators can be used. In particular, when a cellulose fiber separator having a porosity of 60% or more is used, increased resistance, which is caused by shrinkage of the separator, can be suppressed at a high temperature atmosphere, thus preventing reduced output.

In the nonaqueous electrolyte battery according to the embodiment, the positive electrode, the negative electrode, and the nonaqueous electrolyte are combined, and the battery can include the separator disposed between the positive electrode and the negative electrode, and a container containing the positive electrode, the negative electrode, the separator, and the nonaqueous electrolyte. The positive electrode, the negative electrode, the nonaqueous electrolyte, the separator, and the container will be explained below.

1) Positive Electrode

The positive electrode has a positive electrode current collector, and a positive electrode material layer (positive electrode active material-containing layer) which is carried on one side or both sides of the current collector and includes an active material, a conductive agent, and a binder.

In the lithium metal oxide represented by the formula: $LiNi_xM_{1-x}O_2$ wherein M is a metal element including Mn, and x is within a range of $0.5 \leq x \leq 1$, the range of x is set to a range of $0.5 \leq x \leq 1$ because if x is less than 0.5, a high battery capacity cannot be obtained. When the range of x is $0.5 \leq x \leq 1$, the thermal decomposition reaction of the positive electrode active material easily occurs; however, a high capacity can be obtained. When Mn is included in the element of M, the thermal stability of the positive electrode active material is improved, and the thermal decomposition reaction of the positive electrode active material, which occurs in the case of $0.5 \leq x \leq 1$, can be suppressed. As the metal forming the element M, solely Mn may be used, or two or more kinds including Mn may be used. The metal other than Mn included in the element M may include Co, Al, Zr, Nb, Mo, W, and the like. The range of x is more preferably $0.6 \le x \le 0.8$.

Examples of $LiNi_xM_{1-x}O_2$ may include lithium nickel cobalt manganese oxides ($LiNi_yCo_zMn_{1-y-z}O_2$ wherein $0<y<1$, $0<z<1$, and $0<(1-y-z)<1$), and the like.

As the positive electrode active material, $LiNi_xM_{1-x}O_2$ alone or a mixture of $LiNi_xM_{1-x}O_2$ with another oxide may be used. Examples of the other oxide may include lithium nickel oxide ($LiNiO_2$), lithium nickel cobalt oxides ($LiNi_wCo_{1-w}O_2$ wherein $0<w<1$), lithium nickel cobalt aluminum oxides ($LiNi_yCo_zAl_{1-y-z}O_2$ wherein $0<y<1$, $0<z<1$, and $0<(1-y-z)<1$), and the like.

The conductive agent may include, for example, acetylene black, carbon black, graphite, carbon fiber, and the like. The conductive agent may be used in one kind, or two or more kinds.

The positive electrode active material has preferably an average particle size within a range of 1 µm to 15 µm. A more preferable range is from 3 µm to 10 µm. The positive electrode active material may be in any state of a primary particle, a secondary particle wherein the primary particles are an aggregate, or a mixture of the primary particles and the secondary particles.

The binder may include, for example, polytetrafluoroethylene (PTFE), polyvinylidene fluoride (PVdF), fluorine-containing rubber, and the like. The binder may be used in one kind, or two or more kinds.

The blending ratio of the positive electrode active material, the conductive agent, and the binder is preferably within a range of 80 to 95% by weight of the positive electrode active material, 3 to 19% by weight of the conductive agent, and 1 to 7% by weight of the binder.

The positive electrode is produced, for example, by suspending the positive electrode active material, the conductive agent, and the binder in an appropriate solvent, coating the resulting suspension on the aluminum foil or aluminum alloy foil current collector, and drying and pressing it. The positive electrode material layer has preferably a specific surface area, according to a BET method, within a range of 0.1 to 2 m²/g.

The current collector is preferably formed from an aluminum foil or an aluminum alloy foil, and has a thickness of 20 µm or less, more preferably 15 µm or less.

2) Negative Electrode

The negative electrode has a negative electrode current collector, and a negative electrode material layer (negative electrode active material-containing layer) which is carried on one side or both sides of the current collector and includes an active material, a conductive agent, and a binder.

The interplanar spacing $d_{002}$ derived from (002) reflection, according to the X-ray diffraction method, of the graphitized material particles is adjusted to 0.337 nm or less, because the electron conductivity of the graphitized material particles is reduced and thus the high capacity cannot be obtained when the interplanar spacing $d_{002}$ is more than 0.337 nm. The more preferable range thereof is 0.3368 nm or less. The lower limit of the interplanar spacing $d_{002}$ is desirably 0.3355 nm.

Examples of the graphitized material may include artificial graphite, obtained by subjecting a carbon precursor (such as oil, pitch derived from coal, synthetic pitch, mesophase pitch, cokes, or resins) to a heat treatment at 2000 to 3000° C. in an inert atmosphere, natural graphite, and the like. The graphitized material particles satisfying the formula (1) can be produced, for example, by regulating the pulverization condition of the resulting graphitized material after the heat treatment.

The graphitized material particles may be a composite including a metal capable of forming an alloy with lithium such as Si, Al, Sn, Pb, or Zn, or an oxide of the metal described above such as SiOa wherein $0<\alpha \le 2$. The metal or metal oxide may be used in one kind, or two or more kinds. When such a metal is included, the capacity can be increased. Composite particles including an Si material such as Si or SiOα, and graphitized material particles are preferable in terms of the cycle life performance. The composite particles preferably have an Si component content of 10 to 80% by weight.

Examples of the titanium-containing oxide may include titanium oxides, lithium titanium oxides, niobium titanium oxides, and the like. The titanium-containing oxide may be used in one kind, or two or more kinds.

Examples of the titanium oxide may include titanium oxides having a monoclinic system or bronze structure (B), and titanium oxides having an anatase structure. As the titanium oxide, $TiO_2(B)$ having a bronze structure (B) is preferable, and a low crystalline titanium oxide which has been heat-treated at a temperature of 300 to 600° C. is preferable. The titanium oxide can be represented by the general formula: $Li_aTiO_2$ wherein $0 \le a \le 2$. In this case, the composition before charge can be $TiO_2$. Examples of the lithium titanium oxide may include lithium titanium oxides having a spinel structure (such as one represented by the general formula: $Li_{4/3+a}Ti_{5/3}O_4$ wherein $0 \le a \le 2$), lithium titanium oxides having a ramsdellite structure (such as one represented by the general formula: $Li_{2+a}Ti_3O_7$ wherein $0 \le a \le 1$, $Li_{1+b}Ti_2O_4$ wherein $0 \le b \le 1$, $Li_{1.1+b}Ti_{1.8}O_4$ wherein $0 \le b \le 1$, and $Li_{1.07+b}Ti_{1.86}O_4$ wherein $0 \le b \le 1$), lithium and titanium-containing composite oxide which includes at least one element selected from the group consisting of Nb, Mo, W, P, V, Sn, Cu, Ni, and Fe, and the like.

Examples of the niobium titanium oxide may include niobium titanium oxides represented by the general formula: $Li_cNb_dTiO_7$ wherein $0 \le c \le 5$, and $1 \le d \le 4$, and the like.

The covering layer has preferably a thickness of 10 nm or less. When the layer has such a thickness, a diffusion resistance of the lithium ions can be reduced, whereby the output performance can be improved. A more preferable range is from 1 to 5 nm.

When the total content of the graphitized material particles and the covering layer is defined as 100% by weight, the weight ratio of the covering layer is preferably within a range of 0.1% by weight to 5% by weight. When the ratio is within this range, the negative electrode having a high capacity (high energy density) can be realized while the reductive decomposition of the nonaqueous electrolyte by the graphitized material particles is suppressed.

The graphitized material particles can be covered, for example, in the following process. An alkoxide of titanium is dissolved in ethanol, to which lithium is added, and the resulting mixture is brought into contact with the graphitized material particles to cover the surface of the graphitized material particles with a precursor of the lithium titanium oxide. After that, the obtained particles are heat-treated at an appropriate temperature, whereby graphitized material particles covered with a thin film of the lithium titanium oxide are obtained. The contact method (coating method) may include a spray method, and a hydrothermal method.

The covering example is explained. The graphitized material particles are added to ethanol in which titanium tetrapropoxide ($Ti(OC_3H_7)_4$) was dissolved in a given amount, and the mixture is thoroughly stirred. Then an aqueous solution of lithium hydroxide is added thereto in a given amount, and the mixture is stirred at 70° C. Subsequently, hydrothermal synthesis (at a temperature of 100 to 200° C.) was performed, and the resulting product is dried and subjected to a heat treatment at a temperature of 300 to 800° C. in an air atmosphere or an inert atmosphere, whereby graphitized material particles covered with an $Li_{4/3}Ti_{5/3}O_4$ layer or an $Li_aTiO_2$ wherein $0 \leq a \leq 2$ can be obtained. The heat treatment temperature is desirably 500° C. or lower, in order to suppress surface oxidation of the graphitized material particles.

The thickness of the covering layer is measured, for example, from a transmission electron microscope photograph (TEM photograph) of a cross-section of a sample.

The negative electrode has desirably a porosity (excluding the current collector) within a range of 20 to 50%. When the porosity is within this range, the affinity of the negative electrode with the nonaqueous electrolyte is excellent, and the negative electrode having a high density can be obtained. A more preferable range of the porosity is from 25 to 50%.

The negative electrode current collector is desirably a metal foil such as a copper foil, a stainless steel foil, a nickel foil, or a metal foil coated with carbon.

The metal foil has a thickness of 20 μm or less, more preferably 15 μm or less.

The conductive agent may include, for example, acetylene black, carbon black, coke, carbon fiber, graphite, a metal compound powder, a metal powder, and the like. The conductive agent may be used in one kind, or two or more kinds.

The binder may include, for example, polytetrafluoroethylene (PTFE), polyvinylidene fluoride (PVdF), fluorine-containing rubber, styrene-butadiene rubber, core-shell binders, and the like. The binder may be used in one kind, or two or more kinds.

It is preferable that the blending ratio of the active material, the conductive agent, and the binder in the negative electrode is within a range of 90 to 99% by weight of the negative electrode active material, 0 to 5% by weight of the conductive agent, and 2 to 7% by weight of the binder.

The negative electrode can be produced, for example, by suspending the negative electrode active material, the conductive agent, and the binder in an appropriate solvent, coating the resulting suspension on the current collector, drying it, and subjecting it to pressing while heating it.

3) Nonaqueous Electrolyte

The nonaqueous electrolyte may include an organic liquid electrolyte prepared by dissolving an electrolyte in an organic solvent, organic gelatinous electrolyte prepared by combining a liquid organic solvent with a polymeric material, and solid nonaqueous electrolyte prepared by combining an electrolyte of a lithium salt with a polymeric material. A room temperature molten salt including lithium ions (ionic melt) may also be used as the nonaqueous electrolyte. The polymeric material may include, for example, polyvinylidene fluoride (PVdF), polyacrylonitrile (PAN), polyethylene oxide (PEO), and the like.

The organic liquid electrolyte is prepared by dissolving the electrolyte in an organic solvent in a concentration of 0.5 to 2.5 mol/L. When this electrolyte is used, a high output can be obtained even in a low temperature atmosphere. A more preferable range thereof is from 1.5 to 2.5 mol/L.

The electrolyte may include, for example, $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, $LiB[(OCO)_2]_2$, and the like. The electrolyte may be used in one kind, or two or more kinds.

It is especially preferable to include lithium tetrafluoroborate ($LiBF_4$). This enhances the chemical stability of the organic solvent, and the film resistance on the negative electrode can be reduced, and the low temperature performance and the cycle life performance can be remarkably improved.

The organic solvent may include, for example, cyclic carbonates such as propylene carbonate (PC) or ethylene carbonate (EC); chain carbonates such as diethyl carbonate (DEC), dimethyl carbonate (DMC) or methyl ethyl carbonate (MEC); chain ethers such as dimethoxyethane (DME) and diethoxyethane (DEE); cyclic ethers such as tetrahydrofuran (THF) or dioxolane (DOX), γ-butyrolactone (GBL), acetonitrile (AN), sulfolane (SL), and the like. The organic solvent may be used alone or as a mixture of two or more kinds. When at least one compound selected from the group consisting of propylene carbonate (PC), ethylene carbonate (EC), and γ-butyrolactone (GBL) is included, a boiling point is 200° C. or higher, and thus the thermal stability can be improved. In particular, a nonaqueous solvent including γ-butyrolactone (GBL) can dissolve the lithium salt in a high concentration, and thus the output performance in a low temperature atmosphere can be improved.

The room temperature molten salt (ionic melt) preferably comprises the lithium ions, an organic cation, and an organic anion. The room temperature molten salt is also desirably in the state of a liquid at room temperature or lower.

The electrolyte including the room temperature molten salt is explained below.

The term "room temperature molten salt" refers to a salt that at least a part thereof is in the state of a liquid at a room temperature, and the term "room temperature" refers to a temperature range in which it is assumed a power source usually operates. The temperature range in which the power source is assumed to operate is a range in which the upper limit is about 120° C. or about 60° C. in some cases, and the lower limit is about −40° C. or about −20° C. in some cases. Of these, a range of −20° C. to 60° C. is appropriate.

It is desirable to use the ionic melt comprising the lithium ion, the organic cation and anion as the room temperature molten salt including the lithium ions. The ionic melt is preferable in the state of a liquid even at room temperature or less.

The organic cation may include alkyl imidazolium ions and quaternary ammonium ions having a backbone represented by Chemical formula 1 described below.

[Chemical formula 1]

As the alkyl imidazolium ion, dialkyl imidazolium ions, trialkyl imidazolium ions, tetraalkyl imidazolium ions, and the like are preferable. As the dialkyl imidazolium ion, 1-methyl-3-ethylimidazolium ion (MEI+) is preferable. As the trialkyl imidazolium ion, 1,2-diethyl-3-propylimidazolium ion (DMPI+) is preferable. As the tetraalkyl imidazolium ion, 1,2-diethyl-3,4(5)-dimethylimidazolium ion is preferable.

As the quaternary ammonium ion, tetraalkylammonium ions and cyclic ammonium ions are preferable. As the tetraalkylammonium ion, dimethylethylmethoxyethyl ammonium ion, dimethylethylmethoxymethyl ammonium ion, dimethylethylethoxyethyl ammonium ion, and trimethylpropyl ammonium ion are preferable.

When the alkyl imidazolium ion or the quaternary ammonium ion (in particular, the tetraalkyl ammonium ion) is used, the melting point can be set at 100° C. or lower, more preferably 20° C. or lower. Further, the reactivity with the negative electrode can be reduced.

The concentration of the lithium ions is preferably 20 mol % or less, and a more preferable range is within 1 to 10 mol %. When the concentration is within the range, the liquid room temperature molten salt can be easily formed even at a low temperature of 20° C. or lower. In addition, the viscosity can be reduced even at a room temperature or lower, and the ion conductivity can be increased.

It is preferable to allow one or more anions selected from $BF_4^-$, $PF_6^-$, $AsF_6^-$, $ClO_4^-$, $CF_3SO_3^-$, $CF_3COO^-$, $CH3COO^-$, $CO_3^{2-}$, $(FSO_2)_2N^-$, $N(CF_3SO_2)_2^-$, $N(C_2F_5SO_2)_2^-$, and $(CF_3SO_2)_3C^-$ to coexist as the anion. When multiple anions coexist, the room temperature molten salt having a melting point of 20° C. or lower can be easily formed. The preferable anion may include $BF_4^-$, $(FSO_2)_2N^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. When the anions are used, it is easier to form the room temperature molten salt at 0° C. or lower.

4) Separator

The separator can be disposed between the positive electrode and the negative electrode. Examples of the separator may include porous films of an olefin such as polyethylene (PE) or polypropylene (PP), and cellulose fiber separators. The shape of the separator may include a nonwoven fabric, film, paper, or the like. The separator has preferably a porosity of 50% or more. Cellulose fiber separators having a porosity of 60% or more have an excellent ability to impregnate the electrolyte, and exhibit a high output performance from a low temperature to a high temperature. The more preferable range thereof is from 62% to 80%.

When the diameter of a fiber forming the separator is 10 µm or less, an affinity between the nonaqueous electrolyte and the separator is improved, thus resulting in reduced battery resistance. The diameter is more preferably 3 µm or less.

The separator has preferably a thickness of 20 to 100 µm and a density of 0.2 to 0.9 g/cm³. When the thickness is within the range described above, mechanical strength and reduced battery resistance can be balanced well, and a battery which has a high output and in which it is difficult to cause an internal short-circuit can be provided. In addition, a thermal shrinkage is small in a high temperature atmosphere, and an excellent storage performance can be exhibited at a high temperature.

5) Container

For the container containing the positive electrode, the negative electrode, and the nonaqueous electrolyte, a metal container or a laminate film container may be used.

As the metal container, a container formed from aluminum, aluminum alloy, iron, or stainless steel may be used, whose shape may be square or cylindrical. The container has a plate thickness of desirably 0.5 mm or less, more preferably 0.3 mm or less.

The laminate film may include, for example, multilayer films in which the aluminum foil is covered with a resin film, and the like. As the resin, a polymer such as polypropylene (PP), polyethylene (PE), nylon, or polyethylene terephthalate (PET) can be used. The laminate film has preferably a thickness of 0.2 mm or less. The aluminum foil has preferably a purity of 99.5% by mass or more.

For the metal can formed of an aluminum alloy, an alloy including an element such as manganese, magnesium, zinc, or silicon, and having an aluminum purity of 99.8% or less is preferable. The strength of the metal can formed of the aluminum alloy is dramatically increased, and thus it is possible to reduce the wall thickness of the can. As a result, a thin, light, high-output battery having excellent heat radiation can be realized.

Figure 2:
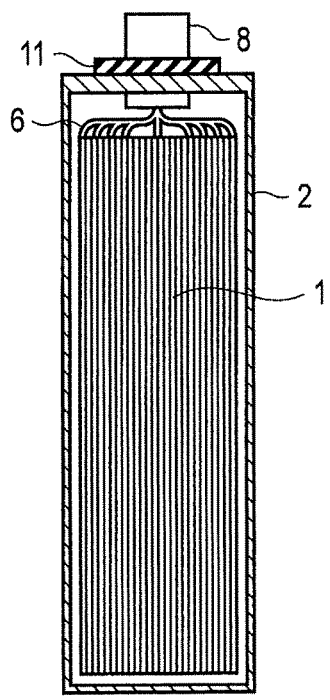
FIG. 2 is a side view of the battery in FIG. 1.

The square type secondary battery according to the first embodiment is shown in FIG. 1 and FIG. 2. As shown in FIG. 1, an electrode group 1 is contained in a rectangular cylindrical metal container 2. The electrode group 1 has a structure in which a positive electrode 3, a negative electrode 4, and a separator 5 interposed between them are spirally wound in a flat shape. The nonaqueous electrolyte (not shown) is held in the electrode group 1. As shown in FIG. 2, strip-shaped positive electrode leads 6 are electrically connected to multiple points on the edge part of the positive electrode 3, located on the edge face of the electrode group 1. In addition, strip-shaped negative electrode leads 7 are electrically connected to multiple points on the edge part of the negative electrode 4, located on the edge face. The multiple positive electrode leads 6 are bundled into one, which is electrically connected to a positive electrode conductive tab 8. A positive electrode terminal is formed from the positive electrode leads 6 and the positive electrode conductive tab 8. The negative electrode leads 7 are bundled into one, which is connected to the negative electrode conductive tab 9. A negative electrode terminal is formed from the negative electrode leads 7 and the negative electrode conductive tab 9. A metal sealing plate 10 is fixed on an opening of the metal container 2 by welding, or the like. The positive electrode conductive tab 8 and the negative electrode conductive tab 9 are each pulled out outward from a hole, provided on the sealing plate 10. An inner circumferential surface of the hole on the sealing plate 10 is covered with an insulating member 11, in order to avoid occurrence of a short circuit, caused by the contact of the positive electrode conductive tab 8 with the sealing plate 10, or the contact of the negative electrode conductive tab 9 with the sealing plate 10.

The kind of the battery is not limited to the square type, and the battery may be formed into various kinds such as a cylinder type, a thin type, and a coin type. The shape of the electrode group is not limited to a flat shape, and it can be formed into, for example, a cylindrical shape, laminated shape, or the like.

According to the nonaqueous electrolyte battery of the first embodiment, as described above, the nonaqueous electrolyte battery can be provided which has excellent safety, output performance, and charge and discharge cycle life performance at a high temperature, because the battery includes the positive electrode including $LiNi_xM_{1-x}O_2$ wherein M is a metal element including Mn, and x is within a range of $0.5 \leq x \leq 1$, and the negative electrode including the graphitized material particles having an interplanar spacing $d_{002}$ of 0.337 nm or less, and the layer including the titanium-containing oxide, which covers at least a part of the surface of the graphitized material particle.

Second Embodiment

A battery pack according to a second embodiment includes one or more of the nonaqueous electrolyte batteries according to the first embodiment. The battery pack may include a battery module formed of multiple batteries. The batteries may be connected to each other in series or in parallel, but series connections, and n multiples (n is an integer of 1 or more) of 6 series connections are preferable.

Figure 3:
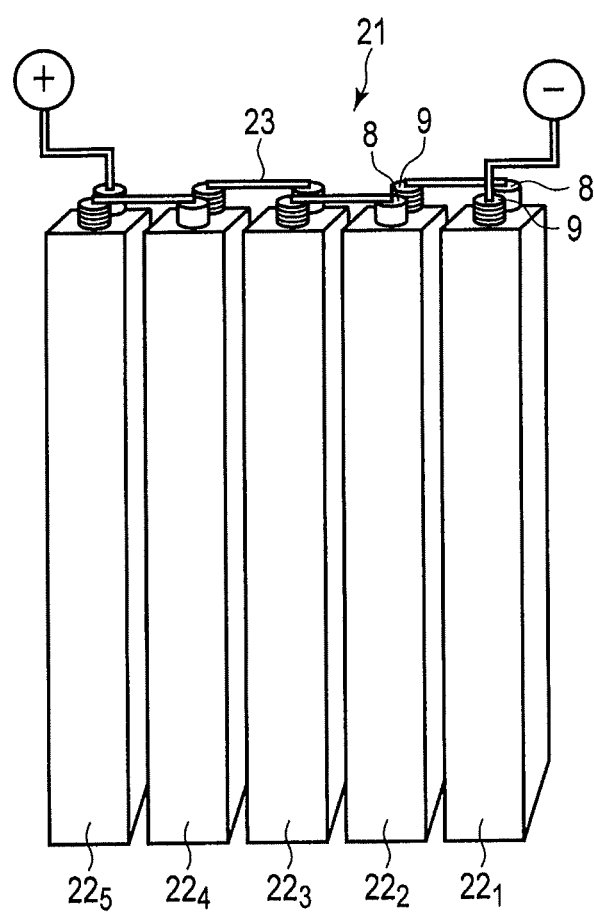
FIG. 3 is a perspective view showing one example of a battery module used in a battery pack according to an embodiment.

One embodiment of a battery module used for a battery pack is shown in FIG. 3. A battery module 21 shown in FIG. 3 includes multiple square type secondary batteries $22_1$ to $22_5$ according to the second embodiment. A positive electrode conductive tab 8 of the secondary battery $22_1$ is electrically connected to a negative electrode conductive tab 9 of the secondary battery $22_2$, which is adjacent to the battery $22_1$, through a lead 23. Furthermore, a positive electrode conductive tab 8 of the secondary battery $22_2$ is electrically connected to a negative electrode conductive tab 9 of a secondary battery $22_3$, which is adjacent to the battery $22_2$, through a lead 23. The batteries $22_1$ to $22_5$ are connected in series in this way.

A metal can formed from aluminum alloy, iron, or stainless steel, or a plastic container may be used as a case for containing the battery module. The container has desirably a plate thickness of 0.5 mm or more.

Embodiments of the battery pack are altered appropriately depending on the use thereof. It is preferable for the use of the battery pack to require a cycle performance with a large current. Specifically, the use may include the use of a power source for a digital camera, or the use for cars such as two- to four-wheel hybrid electric cars, two- to four-wheel electric cars, and assist bicycles. The use for cars is preferable.

According to the second embodiment, a battery pack can be realized which has excellent safety, output performance, and charge and discharge cycle life performance at a high temperature, because it includes the nonaqueous electrolyte battery according to the first embodiment.

EXAMPLE

An example of the embodiments will be explained in detail referring to the drawings, but the embodiments are not limited to the Examples described below.

Example 1

As a positive electrode active material, a lithium nickel cobalt manganese oxide ($LiNi_{0.8}Co_{0.1}Mn_{0.1}O_2$) having a layered structure in which primary particles had an average particle size of 1 μm was used. To the mixture were added 5% by weight, to the whole positive electrode, of acethylene black as a conductive agent, and 5% by weight, to the whole positive electrode, of PVdF as a binder, and the resulting mixture was dispersed in an n-methyl pyrrolidone (NMP) solvent to prepare a slurry. After that, the slurry was coated on both sides of an aluminum alloy foil (purity 99%) having a thickness of 15 μm and dried, and a positive electrode having positive electrode material layers each of which had a thickness of 38 μm and an electrode density of 3.3 g/cm³ was produced through a press step.

As a negative electrode active material, an artificial graphite powder having an interplanar spacing of (002), $d_{002}$, according to the X-ray diffraction method, of 0.3358 nm, and an $(I_s/I_h)$ of 0.1 was added to ethanol in which $Ti(OC_3H_7)_4$ was dissolved, which was thoroughly stirred. After that, an aqueous solution of lithium hydroxide was added thereto, and the mixture was stirred at 70° C. Then, a hydrothermal synthetic treatment was performed at 150° C., and the obtained product was dried and then was heat-treated at 500° C. in an air atmosphere, whereby an artificial graphite powder whose surface was covered with an $Li_{4/3}Ti_{5/3}O_4$ layer was obtained. The covering amount was 1% by weight. The covering layer had a thickness of 10 nm.

The negative electrode active material particles including the artificial graphite powder whose surface was covered with the $Li_{4/3}Ti_{5/3}O_4$ layer (an average particle diameter: 3 μm) and PVdF as a binder were blended in a weight ratio of 96:4, and the mixture was dispersed in an n-methyl pyrrolidone (NMP) solvent. The dispersion was stirred using a ball mill at a number of revolutions of 1000 rpm for 2 hours to prepare a slurry. The obtained slurry was coated on a copper foil (a purity of 99.3%) having a thickness of 15 μm and dried, and a negative electrode having negative electrode material layers each of which had a thickness of 50 μm and an electrode density of 1.4 g/cm³ was produced through a heat press step. The porosity of the negative electrode excluding the current collector was 381. The negative electrode material layer had a BET specific surface area (a surface area per g of the negative electrode material layer) of 5 m²/g.

A method of measuring the average particle diameter of the negative electrode active material particles is shown below. Using a laser diffraction particle size distribution measuring apparatus (Shimadzu SALD-300), 0.1 g of a sample, a surfactant, and 1 to 2 mL of distilled water were first added to a beaker, the mixture was thoroughly stirred, the resulting mixture was poured into a stirring water tank, a light intensity distribution was measured 64 times at an interval of 2 seconds, and the average particle diameter of D50 was found from the particle size distribution data.

The BET specific surface areas, according to $N_2$ absorption, of the negative electrode active material and the negative electrode were measured under the following conditions.

One gram of the powdery negative electrode active material or 2 pieces (2×2 cm²) of the negative electrode, which had been cut off, were used as a sample. A BET specific surface area measuring apparatus manufactured by Yuasa-Ionics Co., Ltd was used, and nitrogen gas was used as the absorption gas.

The porosity of the negative electrode was calculated in a manner in which a volume of the negative electrode material layer was compared to a volume of the negative electrode material layer having a porosity of 0%, and a percentage increase from the volume of the negative electrode material layer having a porosity of 0% was considered as a hole volume. The volume of the negative electrode material layer was the total of the negative electrode material layers on the both sides, when the negative electrode material layers were formed on the both sides of the current collector.

Meanwhile, a positive electrode was covered with a regenerated cellulose fiber separator formed from a pulp as a starting material and having a thickness of 20 μm, porosity of 65% and an average fiber diameter of 1 μm. The negative electrode was overlapped on the positive electrode through the separator, and the negative electrode material layer faced the positive electrode material layer through the separator. The resulting laminate was spirally wound, which was pressed to form into a flat shape, whereby an electrode group was produced.

The electrode group was contained in a thin metal can formed from aluminum alloy (an Al purity of 99%) having a thickness of 0.3 mm.

Meanwhile, an organic liquid electrolyte (a nonaqueous electrolytic solution) was prepared by dissolving 1 mol/L of lithium hexafluoroborate ($LiPF_6$) as the lithium salt in a mixed solvent of propylene carbonate (PC), ethylene carbonate (EC), and diethyl carbonate (DEC) (at a volume ratio of 25:25:50) as the organic solvent. The nonaqueous electrolytic solution was injected into the electrode group in the container, whereby a thin type nonaqueous electrolyte battery having the structure shown in FIG. 1 above, a thickness of 14 mm, a width of 62 mm, a height of 94 mm, a capacity of 5 Ah, and an average voltage of 3.7 V was obtained.

Examples 2 to 11 and Comparative Examples 1 to 6

Thin-type nonaqueous electrolyte batteries were produced in the same manner as in Example 1, except that a negative electrode active material and a positive electrode active material shown in Table 1 below were used.

A negative electrode active material in which artificial graphite particles were covered with a $TiO_2$ layer in Example 6 was synthesized as explained below.

As the negative electrode active material, an artificial graphite powder having a $d_{002}$ of 0.3358 nm and an $(I_r/I_h)$ of 0.1, according to the X-ray diffraction method, was added to ethanol in which $Ti(OC_3H_7)_4$ was dissolved, and the mixture was stirred at 70° C. Then, a hydrothermal synthetic treatment was performed at 150° C., and the obtained product was dried and then subjected to a heat treatment at 500° C. in an air atmosphere, whereby an artificial graphite powder whose surface was covered with the $TiO_2$ layer was obtained. The covering amount was 1%, by weight. The covering layer had a thickness of 10 nm.

A negative electrode active material in which artificial graphite particles were covered with a carbonaceous material in Comparative Example 5 were synthesized as explained below. An artificial graphite powder having a $d_{002}$, according to the X-ray diffraction method, of 0.3358 nm and an $(I_r/I_h)$ of 0.1 as a negative electrode active material was covered with a pitch-based carbonaceous material heat-treated at 1000° C. in an argon atmosphere whereby an artificial graphite powder whose surface covered with the pitch-based carbonaceous material was obtained. The covering amount was 3% by weight. The covering layer had a thickness of 10 nm.

A negative electrode active material in which hard carbon was covered with an $Li_{4/3}Ti_{5/3}O_4$ layer in Comparative Example 6 was synthesized as explained below. A hard carbon powder having a $d_{002}$, according to the X-ray diffraction method, of 0.380 nm and an $(I_r/I_h)$ of 0 as a negative electrode active material was added to ethanol in which $Ti(OC_3H_7)_4$ was dissolved, and the mixture was thoroughly stirred. After that, an aqueous solution of lithium hydroxide was added thereto, and the mixture was stirred at 70° C. Then, a hydrothermal synthetic treatment was performed at 150° C., and the obtained product was dried and then was heat-treated at 500° C. in an air atmosphere, whereby a hard carbon powder whose surface was covered with an $Li_{4/3}Ti_{5/3}O_4$ layer was obtained. The covering amount was 10% by weight. The covering layer had a thickness of 10 nm.

As for the obtained secondary batteries from Examples 1 to 11 and Comparative Examples 1 to 6, a discharge capacity was measured when the battery was charged at 25° C. at a 1 C rate with a constant current up to 4.2 V for 1.5 hours, and then it was discharged at a 1 C up to 3 V. In a high temperature cycle test, the charge and discharge cycle described above was repeated at 45° C., and the number of cycles when a rate of the decreased capacity reached 20% was defined as the number of cycles in the cycle life. As for the output performance, the maximum output density was measured in 10 seconds at 25° C. and −30° C. in the state of a charging rate of 50%. As for the safety test, the highest temperature of the battery was measured in a crushing (a crushing rate of 50%) internal short-circuit test. The measurement results are shown in Table 2 below.

TABLE 1

| | Graphitized material particles or carbon particles | Negative electrode active material | | | | Positive electrode active material |
|---|---|---|---|---|---|---|
| | | $d_{002}$ (nm) | Ir/Ih | Coating product | Average particle diameter (μm) | |
| Example 1 | Artifical graphite | 0.3358 | 0.1 | $Li_{4/3}Ti_{5/3}O_4$ | 3 | $LiNi_{0.8}Co_{0.1}Mn_{0.1}O_2$ |
| Example 2 | Natural graphite | 0.3360 | 0.2 | $Li_{4/3}Ti_{5/3}O_4$ | 2 | $LiNi_{0.8}Co_{0.1}Mn_{0.1}O_2$ |
| Example 3 | Natural graphite | 0.3355 | 0 | $Li_{4/3}Ti_{5/3}O_4$ | 5 | $LiNi_{0.8}Co_{0.1}Mn_{0.1}O_2$ |
| Example 4 | Artifical graphite | 0.3358 | 0 | $Li_{4/3}T_{i5/3}O_4$ | 6 | $LiNi_{0.8}Co_{0.1}Mn_{0.1}O_2$ |
| Example 5 | Artifical graphite | 0.3365 | 0.3 | $Li_{4/3}Ti_{5/3}O_4$ | 1 | $LiNi_{0.8}Co_{0.1}Mn_{0.1}O_2$ |
| Example 6 | Artifical graphite | 0.3358 | 0.1 | $TiO_2$ | 3 | $LiNi_{0.8}Co_{0.1}Mn_{0.1}O_2$ |
| Example 7 | Spherical graphite | 0.3358 | 0.05 | $Li_{4/3}Ti_{5/3}O_4$ | 2 | $LiNi_{0.8}Co_{0.1}Mn_{0.1}O_2$ |
| Example 8 | Fiber graphite | 0.3360 | 0 | $Li_{4/3}Ti_{5/3}O_4$ | 2 | $LiNi_{0.8}Co_{0.1}Mn_{0.1}O_2$ |
| Example 9 | Artifical graphite | 0.3358 | 0.1 | $Li_{4/3}Ti_{5/3}O_4$ | 3 | $LiNi_{0.6}Co_{0.2}Mn_{0.2}O_2$ |
| Example 10 | Artifical graphite | 0.3358 | 0.1 | $Li_{4/3}Ti_{5/3}O_4$ | 3 | $LiNi_{0.5}Co_{0.2}Mn_{0.3}O_2$ |
| Example 11 | Artifical graphite | 0.3370 | 0.1 | $Li_{4/3}Ti_{5/3}O_4$ | 3 | $LiNi_{0.5}Co_{0.2}Mn_{0.3}O_2$ |
| Comparative Example 1 | Artifical graphite | 0.3358 | 0.1 | Nothing | 3 | $LiNi_{0.8}Co_{0.1}Mn_{0.1}O_2$ |
| Comparative Example 2 | Natural graphite | 0.3360 | 0.2 | Nothing | 3 | $LiNi_{0.8}Co_{0.1}Mn_{0.1}O_2$ |
| Comparative Example 3 | Artifical graphite | 0.3355 | 0.05 | Nothing | 10 | $LiNi_{0.8}Co_{0.1}Mn_{0.1}O_2$ |
| Comparative Example 4 | Artifical graphite | 0.3358 | 0 | $Li_{4/3}Ti_{5/3}O_4$ | 15 | $LiMn_2O_4$ |

TABLE 1-continued

| | Graphitized material particles or carbon particles | Negative electrode active material | | | | Positive electrode active material |
|---|---|---|---|---|---|---|
| | | $d_{002}$ (nm) | Ir/Ih | Coating product | Average particle diameter (μm) | |
| Comparative Example 5 | Artifical graphite | 0.3358 | 0.1 | Carbonaceous material | 15 | $LiNi_{0.8}Co_{0.1}Mn_{0.1}O_2$ |
| Comparative Example 6 | Hard carbon | 0.380 | 0 | $Li_{4/3}Ti_{5/3}O_4$ | 2 | $LiNi_{0.8}Co_{0.1}Mn_{0.1}O_2$ |

TABLE 2

| | Discharge capacity at 25° C. (Ah) | Cycle life at 45° C. (number of cycles) | Output density at 25° C. (W/kg) | Output density at −30° C. (W/kg) | Highest temperature upon crushing (°C.) |
|---|---|---|---|---|---|
| Example 1 | 5.0 | 3000 | 2000 | 300 | 120 |
| Example 2 | 4.8 | 2500 | 2200 | 330 | 140 |
| Example 3 | 5.1 | 3000 | 1500 | 250 | 100 |
| Example 4 | 5.0 | 3000 | 1600 | 260 | 110 |
| Example 5 | 4.8 | 2400 | 2500 | 350 | 140 |
| Example 6 | 5.0 | 2800 | 1800 | 180 | 100 |
| Example 7 | 5.0 | 3200 | 2200 | 330 | 110 |
| Example 8 | 4.9 | 3500 | 2300 | 350 | 110 |
| Example 9 | 4.5 | 3300 | 2000 | 300 | 100 |
| Example 10 | 4.4 | 3500 | 2000 | 300 | 100 |
| Example 11 | 4.1 | 3500 | 2000 | 300 | 100 |
| Comparative Example 1 | 5.0 | 800 | 1000 | 100 | 300 |
| Comparative Example 2 | 5.0 | 500 | 1300 | 120 | 350 |
| Comparative Example 3 | 5.0 | 800 | 800 | 50 | 250 |
| Comparative Example 4 | 3.0 | 1200 | 800 | 50 | 200 |
| Comparative Example 5 | 5.0 | 1000 | 800 | 50 | 250 |
| Comparative Example 6 | 4.0 | 2000 | 700 | 40 | 190 |

As is apparent from Table 1 and Table 2, it is found that the batteries from Examples 1 to 11 had a more excellent cycle life at 45° C. and more excellent output densities at 25° C. and −30° C., and the highest temperature in the scratching internal short-circuit test is lower than those in Comparative Examples 1 to 6. In particular, as for the output performances at 25° C. and −30° C., excellent performances were obtained in Examples 2, 5, 7, and 8. In the crushing internal short-circuit test, the highest temperature is low in Examples 3, 6, and 9 to 11, and thus the safety is superior.

According to the nonaqueous electrolyte battery of at least one of the embodiments and Examples described above, the nonaqueous electrolyte battery having excellent safety, output performance, and charge and discharge cycle life performance at a high temperature can be provided, because the battery includes the positive electrode including $LiNi_xM_{1-x}O_2$ (wherein M is a metal element including Mn, and x is within a range of 0.5≤x≤1), and the negative electrode including the graphitized material particles having an interplanar spacing $d_{002}$ of 0.337 nm or less and the layer including the titanium-containing oxide which covers at least a part of the surface of the graphitized material particles.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode;
a negative electrode comprising graphitized material particles having an interplanar spacing of (002), according to an X-ray diffraction method, of 0.337 nm or less as a negative electrode active material, and a layer which comprises a titanium-containing oxide of the formula $Li_{4/3+a}Ti_{5/3}O_4$ wherein 0<a≤2 and covers at least a part of a surface of the graphitized material particles; and
a nonaqueous electrolyte,
wherein the graphitized material particles satisfy the following formula (1):

$$0 \leq I_r/I_h \leq 0.1 \tag{1}$$

wherein $I_h$ is an intensity of a (101) diffraction peak of a hexagonal system of the graphitized material particles according to an X-ray diffraction method, and $I_r$ is an intensity of a (101) diffraction peak of a rhombohedral system of the graphitized material particles according to the X-ray diffraction method.

2. The nonaqueous electrolyte battery according to claim 1, wherein the interplanar spacing of (002) is 0.3368 nm or less.

3. The nonaqueous electrolyte battery according to claim 1, wherein the layer further comprises $Li_aTiO_2$ wherein 0≤a≤2.

4. The nonaqueous electrolyte battery according to claim 1, wherein the graphitized material particles have an average particle diameter of 6 μm or less.

5. The nonaqueous electrolyte battery according to claim 1, wherein the layer has a thickness of 10 nm or less.

6. The nonaqueous electrolyte battery according to claim 1, wherein a weight ratio of the layer is within a range of 0.1% by weight to 5% by weight when a total content of the graphitized material panicles and the layer is 100% by weight.

7. The nonaqueous electrolyte battery according to claim 1, wherein the positive electrode comprises $LiNi_xM_{1-x}O_2$ wherein M is a metal element comprising Mn, and $0.5 \leq x \leq 1$, and another oxide.

8. The nonaqueous electrolyte battery according to claim 7, wherein the metal element of M further comprises at least one selected from the group consisting of Co, Al, Zr, Nb, Mo and W.

9. The nonaqueous electrolyte battery according to claim 1, wherein the graphitized material particles satisfy the formula: $0 \leq I_r/I_h \leq 0.05$.

10. The nonaqueous electrolyte battery according to claim 7, wherein the another oxide is at least one selected from the group consisting of lithium nickel oxide, lithium nickel cobalt oxide, and lithium nickel cobalt aluminum oxide.

11. The nonaqueous electrolyte battery according to claim 1, wherein the positive electrode comprises positive electrode active material particles, and an average particle size of the positive electrode active material particles is from 1 μm to 15 μm.

12. A vehicle comprising the battery pack according to claim 11.

13. The nonaqueous electrolyte battery according to claim 1, wherein a battery voltage of the nonaqueous electrolyte battery is from 2.5 V to 4.2 V.

14. The nonaqueous electrolyte battery according to claim 1, wherein the titanium-containing oxide has an electron conductivity.

15. The nonaqueous electrolyte battery according to claim 1, wherein the titanium-containing oxide has an electron conductivity at a battery voltage range of from 2.5 to 4.2 V.

16. The nonaqueous electrolyte battery according to claim 7, wherein $0.6 \leq x \leq 0.8$.

17. The nonaqueous electrolyte battery according to claim 1, wherein the negative electrode comprising graphitized material particles has an interplanar spacing of (002), according to an X-ray diffraction method, of 0.337-0.3355 nm.

18. The nonaqueous electrolyte battery according to claim 1, wherein the negative electrode comprising graphitized material particles has an interplanar spacing of (002), according to an X-ray diffraction method, of 0.3368-0.3355 nm.

19. The nonaqueous electrolyte battery according to claim 1, wherein the layer has a thickness of 1 to 5 nm.

20. The nonaqueous electrolyte battery according to claim 1, wherein the negative electrode comprises the negative electrode active material consisting of graphitized material particles satisfying the formula (1) and having an interplanar spacing of (002), according to an X-ray diffraction method, of 0.3368-0.3355 nm.

21. A battery pack comprising the nonaqueous electrolyte battery according to claim 1.

\* \* \* \* \*